United States Patent
Gao et al.

(10) Patent No.: US 12,276,372 B2
(45) Date of Patent: Apr. 15, 2025

(54) ROTARY DISPLAY DEVICE

(71) Applicants: Beijing BOE Optoelectronics Technology Co., Ltd., Beijing (CN); BOE Technology Group Co., Ltd., Beijing (CN)

(72) Inventors: Feng Gao, Beijing (CN); Jiyang Shao, Beijing (CN)

(73) Assignees: Beijing BOE Optoelectronics Technology Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 323 days.

(21) Appl. No.: 17/802,015

(22) PCT Filed: Oct. 11, 2021

(86) PCT No.: PCT/CN2021/123147
§ 371 (c)(1),
(2) Date: Aug. 24, 2022

(87) PCT Pub. No.: WO2022/105477
PCT Pub. Date: May 27, 2022

(65) Prior Publication Data
US 2023/0089664 A1    Mar. 23, 2023

(30) Foreign Application Priority Data
Nov. 17, 2020 (CN) .......................... 202011284928.9

(51) Int. Cl.
*F16M 13/02* (2006.01)
*H02J 50/12* (2016.01)

(52) U.S. Cl.
CPC .............. *F16M 13/02* (2013.01); *H02J 50/12* (2016.02)

(58) Field of Classification Search
CPC ......... F16M 13/02; H02J 50/12; G09G 3/005; G09G 3/2092; G09G 2330/025; G02B 30/54
See application file for complete search history.

(56) References Cited

U.S. PATENT DOCUMENTS

2005/0052404 A1*  3/2005  Kim ....................... G09G 3/005
                                                                          345/108
2018/0109194 A1    4/2018  Peng et al.

FOREIGN PATENT DOCUMENTS

| CN | 202422630 U | 9/2012 |
| CN | 202523336 U | 11/2012 |
| CN | 106357104 A | 1/2017 |
| CN | 108599389 A | 9/2018 |

(Continued)

*Primary Examiner* — Stephen G Sherman
(74) *Attorney, Agent, or Firm* — IPro, PLLC

(57) ABSTRACT

Provided is a rotary display device. The rotary display device includes a rotary portion and a stationary portion; wherein the rotary portion is rotatable relative to the stationary portion; the stationary portion includes an electrical signal transmitter circuit; and the rotary portion includes a display module and an electrical signal receiver circuit connected to the display module; wherein the electrical signal transmitter circuit is configured to transmit electrical energy to the electrical signal receiver circuit by magnetic coupling resonance, and the electrical signal receiver circuit is configured to supply power to the display module based on the electrical energy.

19 Claims, 5 Drawing Sheets

(56) References Cited

FOREIGN PATENT DOCUMENTS

| | | |
|---|---|---|
| CN | 108695959 A | 10/2018 |
| CN | 208368110 U | 1/2019 |
| CN | 112466237 A | 3/2021 |

* cited by examiner

ROTARY DISPLAY DEVICE

CROSS-REFERENCE TO RELATED APPLICATION

This application is a U.S. national stage of international application No. PCT/CN2021/123147, filed on Oct. 11, 2021, which claims priority to Chinese Patent Application No. 202011284928.9, filed on Nov. 17, 2020 and entitled "ROTARY DISPLAY DEVICE," the disclosures of which are herein incorporated by reference in their entireties.

TECHNICAL FIELD

The present disclosure relates to the field of display technologies, and particularly relates to a rotary display device.

BACKGROUND

A rotary display device is a new type of stereoscopic display device, and a display module of the display device can rotate at a high speed under driving by a motor. By rotating to different positions, the display module respectively displays different parts of a three-dimensional object. In this way, based on persistence of vision, a stereoscopic display effect of naked eye 3D is achieved.

SUMMARY

The present disclosure provides a rotary display device. The technical solutions are summarized as follows.

In one aspect, a rotary display device is provided. The rotary display device includes: a rotary portion and a stationary portion; wherein the rotary portion is rotatable relative to the stationary portion;

the stationary portion includes an electrical signal transmitter circuit; and wherein the electrical signal transmitter circuit is configured to transmit electrical energy to the electrical signal receiver circuit by magnetic coupling resonance, and is configured to supply power to the display module based on the electrical energy.

Optionally, the electrical signal transmitter circuit includes a first electrical signal converter sub-circuit and a transmitter coil; wherein an input terminal of the first electrical signal converter sub-circuit is configured to connect to a power supply end, an output terminal of the first electrical signal converter sub-circuit is connected to the transmitter coil, and the first electrical signal converter sub-circuit is configured to convert a power supply signal provided by the power supply end to a high-frequency alternating current (AC) electrical signal and to transmit the high-frequency AC electrical signal to the transmitter coil; and the transmitter coil is configured to transmit the electrical energy to the electrical signal receiver circuit driven by the high-frequency AC electrical signal.

Optionally, the first electrical signal converter sub-circuit includes a first converting module and a second converting module; wherein an input terminal of the first converting module is configured to connect to the power supply end, an output terminal of the first converting module is connected to an input terminal of the second converting module, and the first converting module is configured to convert the power supply signal to an initial direct current (DC) electrical signal and to transmit the initial DC electrical signal to the second converting module; and the output terminal of the second converting module is connected to the transmitter coil, and the second converting module is configured to convert the initial DC electrical signal to the high-frequency AC electrical signal and to transmit the high-frequency AC electrical signal to the transmitter coil.

Optionally, the first converting module is a DC-DC power converter; and the second converting module is a high-frequency inverter.

Optionally, the electrical signal receiver circuit includes a receiver coil and a second electrical signal converter sub-circuit; wherein the receiver coil and the transmitter coil are positioned relative to each other and a pitch between the receiver coil and the transmitter coil is less than a pitch threshold;

the receiver coil is connected to an input terminal of the second electrical signal converter sub-circuit, and the receiver coil is configured to transmit a drive AC electrical signal to the second electrical signal converter sub-circuit based on the electrical energy; and an output terminal of the second electrical signal converter sub-circuit is connected to the display module, and the second electrical signal converter sub-circuit is configured to convert the drive AC electrical signal to a target DC electrical signal adapted to the display module and to transmit the target DC electrical signal to the display module.

Optionally, the second electrical signal converter sub-circuit includes a third converting module and a fourth converting module; wherein an input terminal of the third converting module is connected to the receiver coil, an output terminal of the third converting module is connected to an input terminal of the fourth converting module, and the third converting module is configured to convert the drive AC signal to an alternative DC electrical signal and to transmit the alternative DC electrical signal to the fourth converting module;

an output terminal of the fourth converting module is connected to the display module, the fourth converting module is configured to convert the alternative DC electrical signal to the target DC electrical signal and to transmit the target DC electrical signal to the display module, and a voltage of the target DC electrical signal is less than a voltage of the alternative DC electrical signal.

Optionally, the third converting module is a rectifier circuit, and the fourth converting module is a DC-DC power converter.

Optionally, the electrical signal receiver circuit includes an electrical signal processing sub-circuit; wherein an input terminal of the electrical signal processing sub-circuit is connected to an output terminal of the second electrical signal converter sub-circuit, an output terminal of the electrical signal processing sub-circuit is connected to the display module, and the electrical signal processing sub-circuit is configured to process the target DC electrical signal and to transmit the processed target DC electrical signal to the display module, wherein electrical signal processing sub-circuit is configured to perform at least one of voltage regulation and filtering.

Optionally, the electrical signal processing sub-circuit is a voltage regulated filter circuit, and is configured to perform voltage regulation and filtering.

Optionally, the electrical signal receiver circuit further includes a soft start sub-circuit;

wherein an input terminal of the soft start sub-circuit is connected to the output terminal of the second electrical signal converter sub-circuit, an output terminal of the soft start sub-circuit is connected to the display module, and the soft start sub-circuit is configured to control a surge current generated in a case that the target DC electrical signal is transmitted to the display module within a target current range.

Optionally, the soft start sub-circuit includes a switch control module and a switch module; wherein an input terminal of the switch control module is connected to the output terminal of the second electrical signal converter sub-circuit, a control end of the switch control module is connected to the switch module, and the switch control module is configured to transmit a drive signal to the switch module based on the target current circuit electrical signal;

the switch module is further connected to the display module, and is configured to transmit, in response to the drive signal, the target DC electrical signal to the display module.

Optionally, the stationary portion further includes a base, wherein the electrical signal transmitter circuit is disposed within the base.

Optionally, the display module includes a plurality of mini organic light-emitting diodes.

Optionally, the rotary display device is a three-dimensional display device.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description illustrate merely some embodiments of the present disclosure, and a person of ordinary skill in the art may still derive other drawings from these accompanying drawings without creative efforts.

DETAILED DESCRIPTION

For clearer descriptions of the objectives, technical solutions, and advantages of the embodiments of the present disclosure, further detailed illustration is made to the invention concept protected by embodiments of the present disclosure below with reference to the accompanying drawings and some embodiments.

Figure 1:
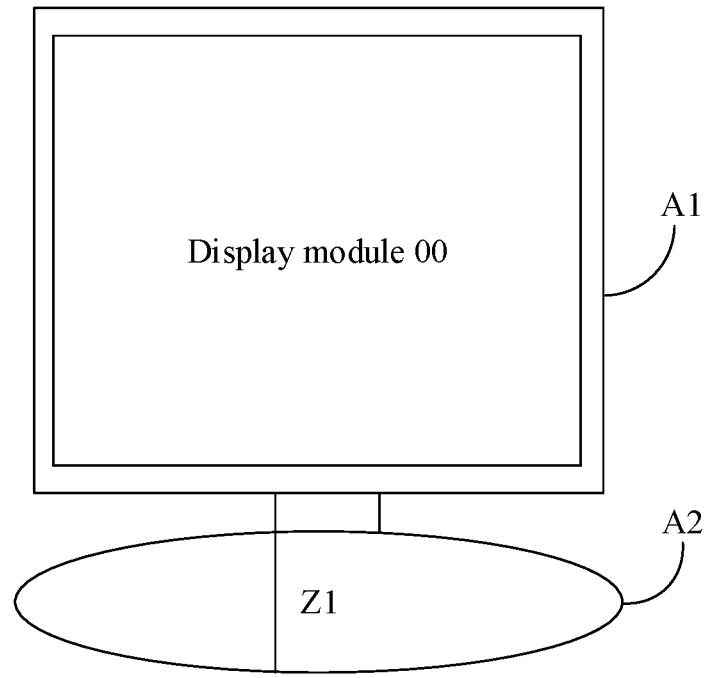
FIG. 1 is a schematic structural diagram of a rotary display device according to an embodiment of the present disclosure.

FIG. 1 is a schematic structural diagram of a rotary display device. As shown in FIG. 1, the rotary display device includes a rotary portion A1 and a stationary portion A2.

The rotary portion A1 can be rotatable relative to the stationary portion A2, in other words, the stationary portion A2 can be stationary relative to the rotary portion A1. Thus, in order to ensure proper display, a display module used for display in the rotary display device generally requires to be provided within the rotating part A1. That is, referring to FIG. 1, the rotation portion A1 may include a display module 00. Moreover, a power supply circuit for supplying power to the rotary display device is also required.

It should be noted that due to a large amount of data to be processed by the rotary display device, high refresh rate (thousands to tens of thousands of hertz), complex control, high power consumption and more sensitive to the supply voltage, the rotary display device also has higher requirements for the power supply circuit and power supply method, and generally requires a wireless supply method.

The related art provides a power supply method in which a brush is provided in a stationary portion A2 and a conductive ring is provided in a rotary portion A1 that is connected to the display module 00. The contact between the brush and the conductive ring can generate an electric signal, which can be further provided to the display module 00 to realize power supply to the display module 00. However, this method has problems such as poor contact and wear due to long-term use. This may lead to poor power supply stability, and correspondingly, the working stability of the rotary display device may be poor. In addition, the post-maintenance costs of the brush and conductive ring used in this power supply method is high.

In order to ensure the working stability of the rotary display device, the embodiments of the present disclosure discard the power supply method in the above related art, and provide a contactless power supply method by magnetic coupling resonance. In order to realize the power supply method, a power supply circuit capable of realizing the power supply method requires to be provided in the rotary display device.

Figure 2:
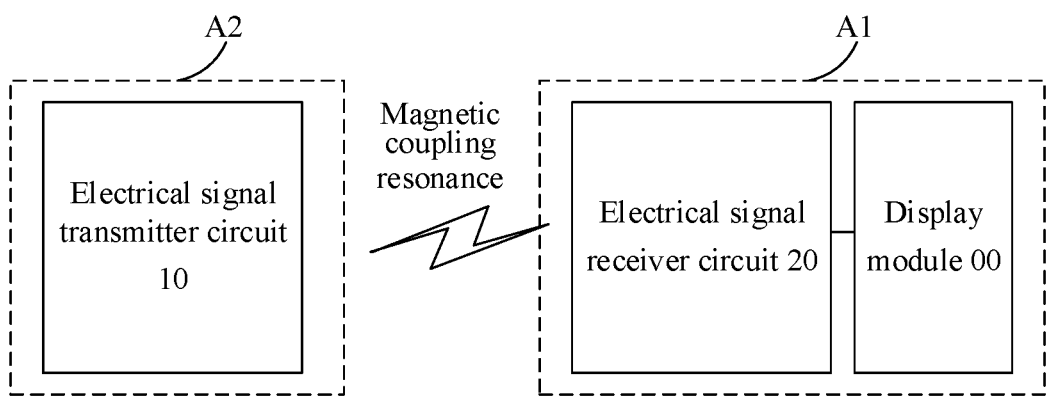
FIG. 2 is a schematic structural diagram of another rotary display device according to an embodiment of the present disclosure.

Optionally, in combination with another rotary display device shown in FIG. 2, the stationary portion A2 of the rotary display device recited in the embodiments of the present disclosure may include an electrical signal transmitter circuit 10. The rotary portion may include an electrical signal receiver circuit 20 connected to the display module 00.

The electrical signal transmitter circuit 10 is configured to transmit electrical energy to the electrical signal receiver circuit 20 by magnetic coupling resonance; and the electrical signal receiver circuit 20 is configured to supply power to the display module 00 based on the received electrical energy. That is, the electrical signal transmitter circuit 10 and the electrical signal receiver circuit 20 together form the power supply circuit of the rotary display device. Moreover, since the electrical signal transmitter circuit 10 belongs to a stationary portion A2, the electrical signal transmitter circuit 10 can also be referred to as a stationary part of the power supply circuit. Since the electrical signal receiver circuit 20 belongs to the rotary portion A1, the electric signal receiver circuit 20 can also be referred to as a rotatable part of the power supply circuit.

The transmission of electric energy by magnetic coupling resonance means that using the principle of electromagnetic coupling and coil resonance induction to transmit electrical energy without contact. In this way, no poor contact occurs during power supply, and the power supply is stable. In addition, the post-maintenance cost of the power supply circuit that realizes this power supply method is low, and it also enriches the application scenarios of wireless power supply based on magnetic coupling resonance.

In conclusion, the embodiments of the present disclosure provide a rotary display device in which a stationary portion of the rotary display device includes an electrical signal transmitter circuit and a rotary portion includes an electrical signal receiver circuit. Since the electrical signal transmitter circuit transmits electrical energy to the electric signal receiver circuit by means of magnetic coupling resonance to enable the electric signal receiver circuit to supply power to the display module based on the electrical energy, it can be determined that the two circuits supplying power to the display module are not in contact with each other. In this way, no poor contact occur, the stability of the power supply to the display module is good, and thus, the working stability of the rotary display device is better.

Figure 3:
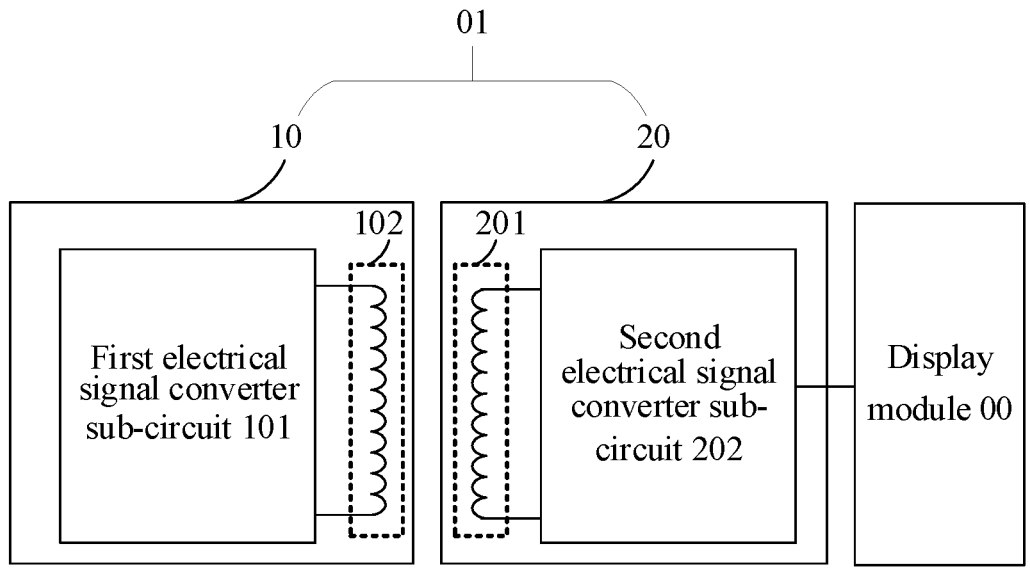
FIG. 3 is a schematic structural diagram of still another rotary display device according to an embodiment of the present disclosure.

Optionally, since the electrical signal transmitter circuit 10 and the electric signal receiver circuit 20 are interacted by magnetic coupling resonance. Therefore, referring to still another rotary display device shown in FIG. 3, the electrical signal transmitter circuit 10 recited in the power supply circuit 01 of an embodiment of the present disclosure may include: a first electrical signal converter sub-circuit 101 and a transmitter coil 102. The electric signal receiver circuit 20 may include: a receiver coil 201 and a second electrical signal converter sub-circuit 202.

Furthermore, the receiver coil 201 and the transmitter coil 102 are positioned relative to each other and a pitch between the receiver coil and the transmitter coil is less than a pitch threshold. By setting the pitch less than the pitch threshold, the interference of other medium (e.g., air) can be reduced when electrical energy is transmitted between the two coils, which ensures reliable and effective transmission of electrical energy. It can also be determined that the resonance in the above-mentioned magnetic coupling resonance refers to the coil resonance between the transmitter coil 102 and the receiver coil 201. It can be further determined that the electric signal transmitter circuit 10 and the electric signal receiver circuit 20 are not in contact with each other.

An input terminal of the first electrical signal converter sub-circuit 101 is configured to connect to a power supply end (not shown in the figure), and an output terminal of the first electrical signal converter sub-circuit 101 is connected to the transmitter coil 102. The first electrical signal converter sub-circuit 101 is configured to convert a power supply signal provided by the power supply end to a high-frequency AC electrical signal and to transmit the high-frequency AC electrical signal to the transmitter coil 102.

Optionally, the power signal provided by the power supply end is a DC power signal. However, since the transmitter coil 102 generally requires to properly transmit electrical energy in response to the high-frequency AC electrical signal, the first electrical signal converter sub-circuit 101 is provided to convert the power signal provided by the power supply end to high-frequency AC before it is transmitted to the transmitter coil, which can ensure the reliable work of the transmitter coil 102.

The transmitter coil 102 is configured to transmit the electrical energy to the electrical signal receiver circuit 20 driven by the high-frequency AC electrical signal. That is, the transmitter coil 102 can transmit energy outwardly. Since the receiver coil 201 and the transmitter coil 102 are positioned relative to each other, it also means that the energy is transmitted to this receiver coil 201.

The receiver coil 201 is connected to an input terminal of the second electrical signal converter sub-circuit 202. The receiver coil 201 is configured to transmit a drive AC electrical signal to the second electrical signal v sub-circuit 202 based on the received electrical energy. That is, the receiver coil 201 may inductively generate a drive AC signal based on the received electrical energy and then transmit the generated drive AC signal to the second electrical signal converter sub-circuit 202 that is connected to the receiver coil 201.

Optionally, the embodiments of the present disclosure do not limit the number of turns of the transmitter coil 102 and receiver coil 201.

An output terminal of the second electrical signal converter sub-circuit 202 is connected to the display module 00. The second electrical signal converter sub-circuit 202 can be configured to convert the drive AC electrical signal to a target DC electrical signal adapted to the display module 00 and to transmit the target DC electrical signal to the display module 00.

Optionally, the target DC electrical signal adapted to the display module 00 may refer to a target DC signal with a desired potential level of the display module 00. The display module 00 can work reliably in response to the received target DC electrical signal, for example, the display module 00 can be driven by the target DC electrical signal to rotate for proper display.

As described in the above embodiments, since the display module generally require to work in response to DC electrical signals, and the generated electrical signals based on the electrical energy directly transmitted from the coil (including the transmitter coil 102 and receiver coil 201) are generally AC electrical signals. Therefore, the second electrical signal converter sub-circuit 202 is provided to convert the drive AC electrical signal to the target DC electrical signal adapted to the display module 00, which can ensure the reliable work of the display module 00.

Figure 4:
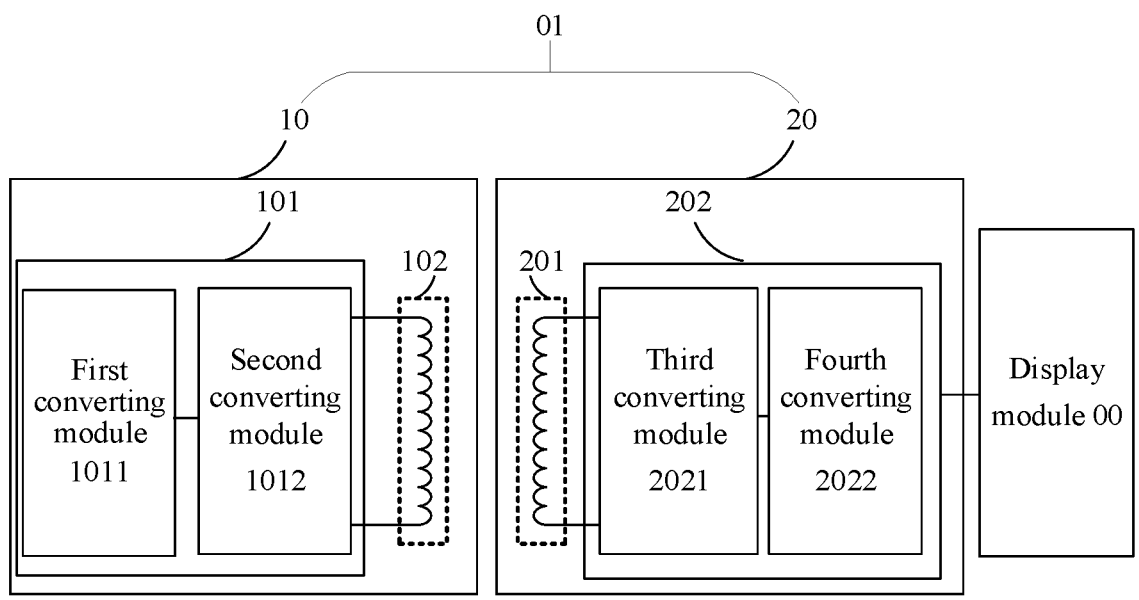
FIG. 4 is a schematic structural diagram of yet still another rotary display device according to an embodiment of the present disclosure.

Optionally, FIG. 4 is a structural diagram of yet still another rotary display device provided by an embodiment of the present disclosure. As shown in FIG. 4, the first electrical signal converter sub-circuit 101 includes: a first converting module 1011 and a second converting module 1012.

An input terminal of the first converting module 1011 is connected to the power supply end, and an output terminal of the first converting module 1011 is connected to an input terminal of the second converting module 1012. The first converting module 1011 is configured to convert the power supply signal to an initial DC electrical signal and to transmit the initial DC electrical signal to the second converting module 1012.

Optionally, the first converting module 1011 is a DC-DC power converter. Based on the working principle of the DC-DC power converter, it is known that the signal converted by the DC-DC power converter is of better quality and more stable compared to the signal before conversion. Therefore, it can be determined that the initial DC electrical signal is of better quality and more stable with respect to the power supply signal. In addition, compared to directly transmitting the power signal to the second converting module 1012, the first converting module 1011 is provided to convert the power signal to a better quality and more stable electrical signal before it is transmitted to the second converting module 1012, which can ensure the reliability and stability of the second converting module 1012, and further can ensure the stability of subsequent electrical energy transmission and other operations.

The output terminal of the second converting module 1012 is connected to the transmitter coil 102; the second converting module 1012 is configured to convert the received initial DC electrical signal to the high-frequency AC electrical signal and to transmit the high-frequency AC electrical signal to the transmitter coil 102.

In combination with the operating principles of the first converting module 1011 and the second converting module 1012, the first electrical signal converter sub-circuit 101 described in the embodiments of the present disclosure may first convert the power supply signal provided at the power supply end to a better quality and more stable initial DC electrical signal, and then further convert the initial DC electrical signal to a high-frequency AC electrical signal required for the work of the transmitter coil 102 before it is transmitted to the transmitter coil 102.

Optionally, the second converting module 1012 is a high-frequency inverter. A high-frequency inverter is a circuit that can convert low-voltage DC power into high-frequency low-voltage AC power by the high-frequency DC/AC conversion technology.

With further referring to FIG. 4, the second electrical signal converter sub-circuit 202 includes a third converting module 2021 and a fourth converting module 2022.

An input terminal of the third converting module 2021 is connected to the receiver coil 201, an output terminal of the third converting module 2021 is connected to an input terminal of the fourth converting module 2022. The third converting module 2021 is configured to convert the drive AC signal to an alternative DC electrical signal and to transmit the alternative DC electrical signal to the fourth converting module 2022.

Optionally, the third converting module 2021 is a rectifier circuit.

An output terminal of the fourth converting module 2022 is connected to the display module 00. The fourth converting module 2022 is configured to convert the alternative DC electrical signal to the target DC electrical signal and to transmit the target DC electrical signal to the display module 00.

Optionally, a voltage of the target DC electrical signal is less than a voltage of the alternative DC electrical signal. The fourth converting module is a DC-DC power converter.

Based on the above description of the DC-DC power converter, as compared with the alternative DC electrical signal being directly transmitted to the display module 00, the fourth converting module 2022 is configured to convert the alternative DC electrical signal to the target DC electrical signal before the alternative DC electrical signal is transmitted to the display module 00, such that the stability and reliability of the power supply to the display module 00 are further ensured. Moreover, the stability and reliability of the display module 00 are further ensured.

Figure 5:
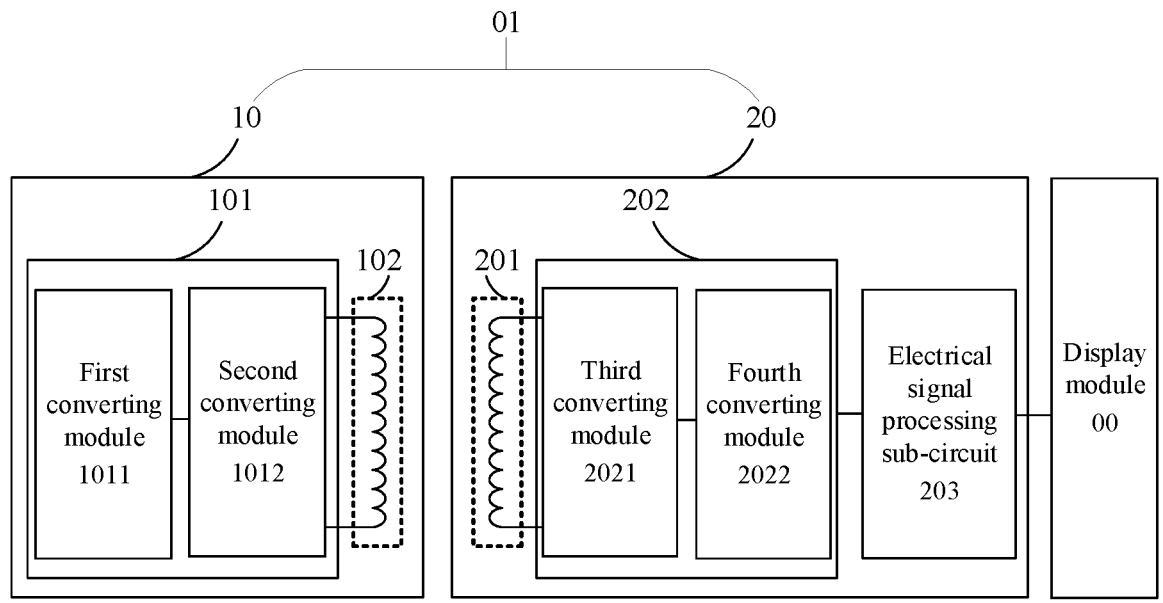
FIG. 5 is a schematic structural diagram of yet still another rotary display device according to an embodiment of the present disclosure.

Optionally, FIG. 5 is a schematic structural diagram of yet still another rotary display device according to an embodiment of the present disclosure. As shown in FIG. 5, the electrical signal receiver circuit 20 further includes an electrical signal processing sub-circuit 203.

An input terminal of the electrical signal processing sub-circuit 203 is connected to an output terminal of the second electrical signal converter sub-circuit 202, an output terminal of the electrical signal processing sub-circuit 203 is connected to the display module 00. The electrical signal processing sub-circuit 203 is configured to process the target DC electrical signal and to transmit the processed target DC electrical signal to the display module 00, wherein the electrical signal processing sub-circuit is configured to perform at least one of voltage regulation and filter.

For example, the input terminal of the electrical signal processing sub-circuit 203 may be connected to the output terminal of the fourth converting module 2022 of the second electrical signal converter sub-circuit 202. The electrical signal processing sub-circuit 203 may be a voltage regulated filter circuit, and accordingly, a processing of the target DC electrical signal by using the electrical signal processing sub-circuit 203 may include voltage regulation and filter.

The voltage regulated filter processing can filter out the low-frequency clutter and high-frequency clutter of the target DC electrical signal, reduce the fluctuation of the target DC electrical signal, and enable the target DC electrical signal eventually received by the display module 00 to have smaller ripples, better quality, and higher stability.

Figure 6:
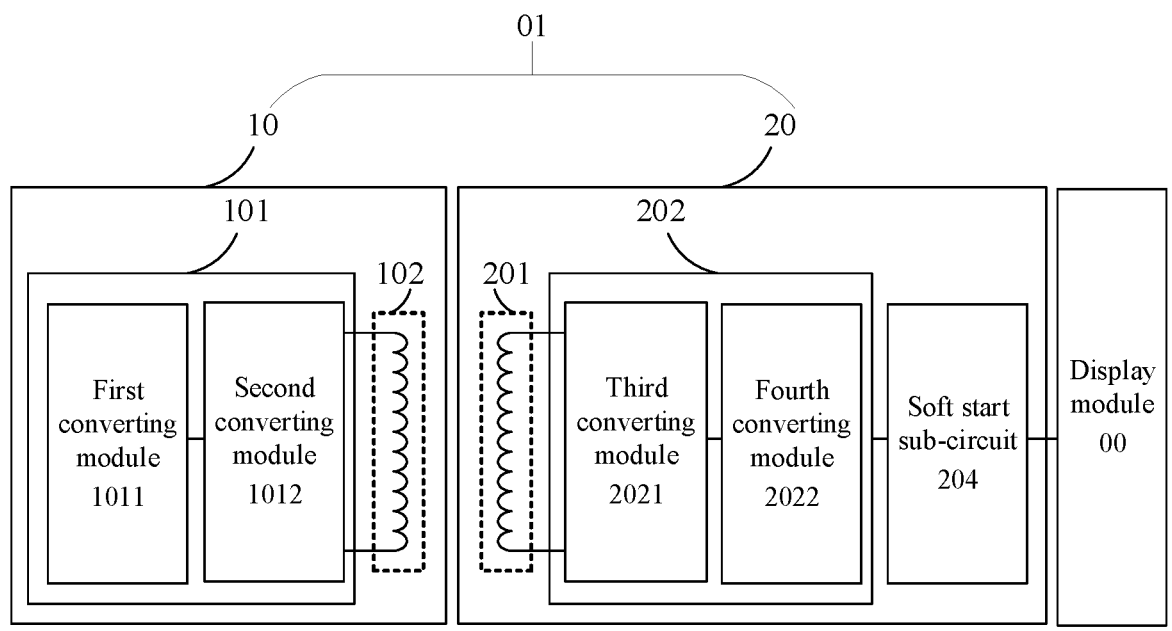
FIG. 6 is a schematic structural diagram of yet still another rotary display device according to an embodiment of the present disclosure.

Optionally, FIG. 6 is a schematic structural diagram of yet still another rotary display device provided by the embodiments of the present disclosure. As shown in the FIG. 6, the electrical signal receiver circuit 20 further includes a soft start sub-circuit 204.

An input terminal of the soft start sub-circuit 204 is connected to an output terminal of the second electrical signal converter sub-circuit 202, and an output terminal of the soft start sub-circuit 204 is connected to the display module 00. The soft start sub-circuit 204 is configured to control a surge current generated in a case that the target DC electrical signal is transmitted to the display module 00 within a target current range. Optionally, the target current range may refer to: the output capability range of the power supply circuit 01. Therefore, that is, the soft start sub-circuit 204 can be configured to control the surge current generated in a case that the target DC electrical signal is transmitted to the display module 00 within the output capability range of the power supply circuit 01.

Figure 7:
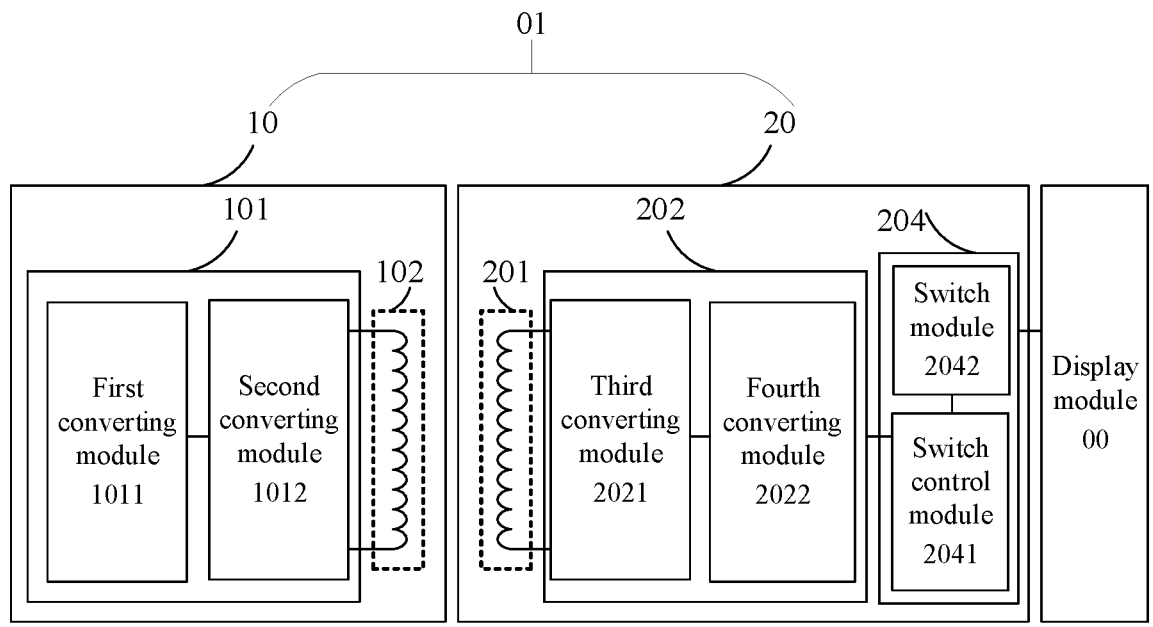
FIG. 7 is a schematic structural diagram of yet still another rotary display device according to an embodiment of the present disclosure.

For example, referring to the schematic structural diagram of yet still another rotary display device shown in FIG. 7, the soft start sub-circuit 204 includes a switch control module 2041 and a switch module 2042.

An input terminal of the switch control module 2041 is connected to the output terminal of the second electrical signal converter sub-circuit 202, a control end of the switch control module 2041 is connected to the switch module 2042, and the switch module 2042 is further connected to the display module 00.

The switch control module 2041 is configured to transmit a drive signal to the switch module 2042 based on the target DC electrical signal, and the switch module 2042 is configured to transmit, in response to the received drive signal, the target DC electrical signal to the display module 00. The display module 00 may be turned on slowly in accordance with a certain rate based on the target DC electrical signal. In this way, the surge current generated at the moments of turn on of the display module can be effectively reduced, such that the surge current is maintained within the output capacity of the power supply circuit 01, further improving the power supply stability of the power supply circuit.

Figure 8:
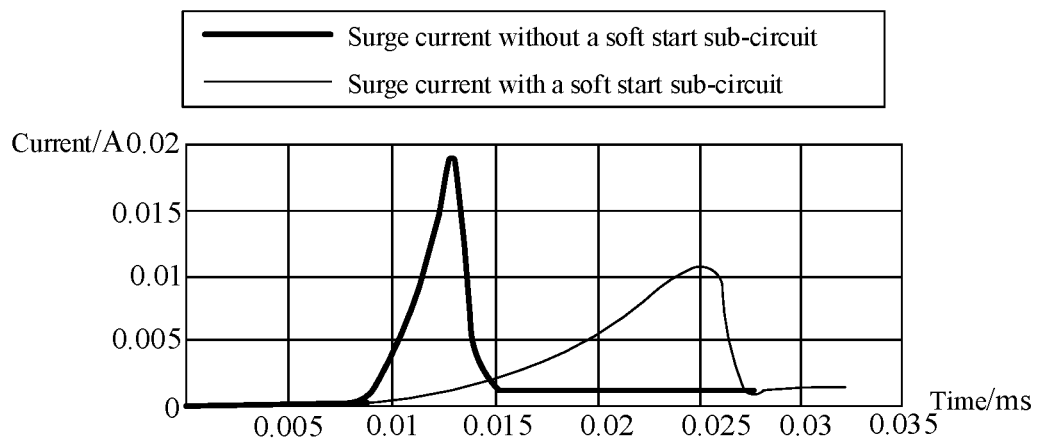
FIG. 8 is a schematic diagram of a surge current according to an embodiment of the present disclosure.

Exemplarily, FIG. 8 illustrates a schematic diagram of the surge currents generated in a case that the soft start sub-circuit 204 is disposed and in a case that the soft start sub-circuit 204 is not disposed. The horizontal axis refers to time, which may be in milliseconds (ms); and the vertical axis refers to the inrush current, which may be in Amperes (A).

Referring to FIG. 8, in a case that the soft start sub-circuit 204 is disposed, the maximum peak of the surge current is about 0.01 A, while without the soft start sub-circuit 204, the maximum peak of the surge current reaches about 0.02 A. In a case that the soft start sub-circuit 204 is disposed, the surge current reaches the peak in about 0.025 seconds, while without the soft start sub-circuit 204, the surge current reaches the peak in about 0.012 seconds. In this way, it can be further determined that providing the soft start sub-circuit 204 can effectively reduce the surge current and further improve the stability of the power supply.

It is noted that, in combination with FIGS. 6 and 7, the input terminal of the soft start sub-circuit 204 may be directly connected to the output terminal of the second electrical signal converter sub-circuit 202. That is, the electrical signal receiver circuit 20 does not include the electrical signal processing sub-circuit 203. Alternatively, in combination with FIGS. 5 and 9, the electrical signal receiver circuit 20 may also include the electrical signal processing sub-circuit 203, and accordingly, the input terminal of the soft start sub-circuit 204 may be directly connected to the output terminal of the electrical signal processing sub-circuit 203. That is, the soil start sub-circuit 204 may be indirectly connected to the output terminal of the second electrical signal converter sub-circuit 202 through the electrical signal processing sub-circuit 203.

Figure 9:
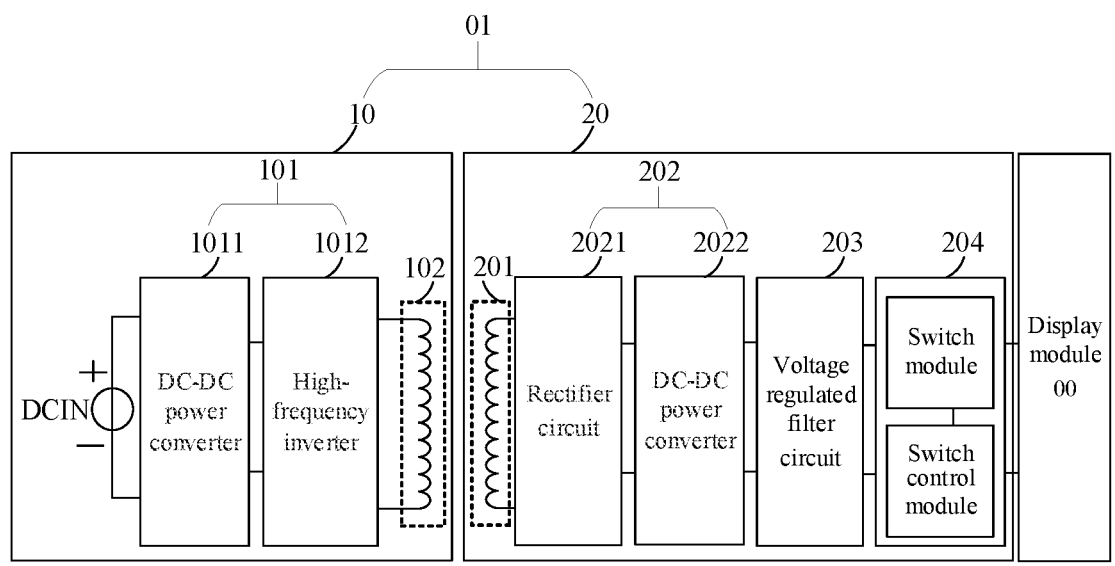
FIG. 9 is yet another schematic structural diagram of a rotary display device according to an embodiment of the present disclosure.

Optionally, referring to FIG. 9, the first converting module 1011 (i.e., the first electrical signal converter sub-circuit 101) may be connected to the power supply end through the power supply interface DCIN. And in the rotary display device shown in FIG. 9, the first converting module 1011 and the fourth converting module 2022 are DC-DC power converters, the second converting module 1012 is a high-frequency inverter, the third converting module 2021 is a rectifier circuit, and the electrical signal processing sub-circuit 203 is a voltage regulated filter circuit.

As shown in FIG. 1, the stationary portion A2 included in the rotary display device also includes a base Z1, wherein the electric signal transmission circuit 10 may be disposed within the base Z1.

Optionally, the display module 00 may include: a plurality of mini light-emitting diodes (mini LEDs), that is, the rotary display device may be a mini LED display device. Alternatively, the display module 00 may include a plurality of organic light-emitting diodes (OLED), that is, the rotary display device may be an OLED display device. The embodiments of the present disclosure do not limit the type of light-emitting elements included in the display module in the display device.

Optionally, the rotary display device may be a three-dimensional (3D) display device. Alternatively, the rotary display device may also be a 2D display device, which is not limited by the embodiments of the present disclosure.

The electrical signal transmitter circuit 10 described in the above embodiments may be referred to as a wireless power supply transmitting module, and the electrical signal receiver circuit 20 may be referred to as a wireless power supply receiving module. The entire power supply mechanism of the embodiments of the present disclosure is as follows: the wireless power supply transmitting module transmits electrical energy to the wireless power supply receiving module of magnetic coupling resonance based on the power signal input from the external power supply end, and then the wireless power supply receiving module supplies power to the connected display module 00 based on the received electrical energy. Compared with the conventional solution, this power supply method is more stable and the ripples of the electrical signal received by display module 00 are smaller, which can adequately satisfy the power demand of the rotary display device.

In conclusion, the embodiments of the present disclosure provide a rotary display device in which a stationary portion of the rotary display device includes an electrical signal transmitter circuit and a rotary portion includes an electrical signal receiver circuit. Since the electrical signal transmitter circuit transmits electrical energy to the electric signal receiver circuit by magnetic coupling resonance to enable the electric signal receiver circuit to supply power to the display module based on the electrical energy, it can be determined that the two circuits supplying power to the display module are not in contact with each other. In this way, no poor contact occurs, the stability of the power supply to the display module is good, and thus, the working stability of the rotary display device is better.

In the embodiment of the present disclosure, the terms "first," "second," "third," and "fourth" are used for descriptive purposes only and are not to be understood as indicating or implying relative importance.

The term "plurality" in the embodiments of the present disclosure is meant to refer to two or more than two.

The term "and/or" in the embodiments of the present disclosure is simply a description of an associated relationship of associated objects, indicating that three relationships may be present, e.g., A and/or B, which may refer to the presence of A alone, the presence of both A and B, and the presence of B alone.

Described above are merely optional embodiments of the present disclosure, and are not intended to limit the present disclosure. Any modifications, equivalent substitutions, improvements, and the like may be made within the protection scope of the present disclosure, without departing from the spirit and principle of the present disclosure.

What is claimed is:

1. A rotary display device, comprising: a rotary portion and a stationary portion; wherein the rotary portion is rotatable relative to the stationary portion;

the stationary portion comprises an electrical signal transmitter circuit; and the rotary portion comprises a display module and an electrical signal receiver circuit connected to the display module;

wherein the electrical signal transmitter circuit is configured to transmit electrical energy to the electrical signal receiver circuit by magnetic coupling resonance, and the electrical signal receiver circuit is configured to supply power to the display module based on the electrical energy; and the electrical signal receiver circuit comprises a receiver coil, a second electrical signal converter sub-circuit, and an electrical signal processing sub-circuit, wherein the receiver coil is connected to an input terminal of the second electrical signal converter sub-circuit, an output terminal of the second electrical signal converter sub-circuit is connected to an input terminal of the electrical signal processing sub-circuit, and an output terminal of the electrical signal processing sub-circuit is connected to the display module; the receiver coil is configured to transmit a drive AC electrical signal to the second electrical signal converter sub-circuit based on the electrical energy; the second electrical signal converter sub-circuit is configured to convert the drive AC electrical signal to a target DC electrical signal adapted to the display module and to transmit the target DC electrical signal to the display module; and electrical signal processing sub-circuit is configured to process the target DC electrical signal and to transmit the processed target DC electrical signal to the display module, wherein the electrical signal processing sub-circuit is configured to perform at least one of voltage regulation and filtering.

2. The rotary display device according to claim 1, wherein the electrical signal transmitter circuit comprises a first electrical signal converter sub-circuit and a transmitter coil; wherein an input terminal of the first electrical signal converter sub-circuit is configured to connect to a power supply, an output terminal of the first electrical signal converter sub-circuit is connected to the transmitter coil, and the first electrical signal converter sub-circuit is configured to convert a power supply signal provided by the power supply to a high-frequency alternating current (AC) electrical signal and to transmit the high-frequency AC electrical signal to the transmitter coil; and the transmitter coil is configured to transmit the electrical energy to the electrical signal receiver circuit driven by the high-frequency AC electrical signal.

3. The rotary display device according to claim 2, wherein the first electrical signal converter sub-circuit comprises a first converting module and a second converting module;

an input terminal of the first converting module is configured to connect to the power supply, an output terminal of the first converting module is connected to an input terminal of the second converting module, and the first converting module is configured to convert the power supply signal to an initial direct current (DC) electrical signal and to transmit the initial DC electrical signal to the second converting module; and an output terminal of the second converting module is connected to the transmitter coil, and the second converting module is configured to convert the initial DC electrical signal to the high-frequency AC electrical signal and to transmit the high-frequency AC electrical signal to the transmitter coil.

4. The rotary display device according to claim 3, wherein the first converting module is a DC-to-DC power converter; and the second converting module is a high-frequency inverter.

5. The rotary display device according to claim 4, wherein the electrical signal receiver circuit comprises a receiver coil and a second electrical signal converter sub-circuit, the receiver coil and the transmitter coil are positioned relative to each other, and a pitch between the receiver coil and the transmitter coil is less than a pitch threshold;

the receiver coil is connected to an input terminal of the second electrical signal converter sub-circuit, and is configured to transmit a drive AC electrical signal to the second electrical signal converter sub-circuit based on the electrical energy; and an output terminal of the second electrical signal converter sub-circuit is connected to the display module, and the second electrical signal converter sub-circuit is configured to convert the drive AC electrical signal to a target DC electrical signal adapted to the display module and to transmit the target DC electrical signal to the display module.

6. The rotary display device according to claim 3, wherein the electrical signal receiver circuit comprises a receiver coil and a second electrical signal converter sub-circuit, the receiver coil and the transmitter coil are positioned relative to each other, and a pitch between the receiver coil and the transmitter coil is less than a pitch threshold;

the receiver coil is connected to an input terminal of the second electrical signal converter sub-circuit, and is configured to transmit a drive AC electrical signal to the second electrical signal converter sub-circuit based on the electrical energy; and an output terminal of the second electrical signal converter sub-circuit is connected to the display module, and the second electrical signal converter sub-circuit is configured to convert the drive AC electrical signal to a target DC electrical signal adapted to the display module and to transmit the target DC electrical signal to the display module.

7. The rotary display device according to claim 2, wherein the receiver coil and the transmitter coil are positioned relative to each other, and a pitch between the receiver coil and the transmitter coil is less than a pitch threshold.

8. The rotary display device according to claim 7, wherein the second electrical signal converter sub-circuit comprises a third converting module and a fourth converting module;

an input terminal of the third converting module is connected to the receiver coil, an output terminal of the third converting module is connected to an input terminal of the fourth converting module, and the third converting module is configured to convert the drive AC signal to an alternative DC electrical signal and to transmit the alternative DC electrical signal to the fourth converting module;

an output terminal of the fourth converting module is connected to the display module, the fourth converting module is configured to convert the alternative DC electrical signal to the target DC electrical signal and to transmit the target DC electrical signal to the display module, and a voltage of the target DC electrical signal is less than a voltage of the alternative DC electrical signal.

9. The rotary display device according to claim 8, wherein the third converting module is a rectifier circuit; and the fourth converting module is a DC-DC power converter.

10. The rotary display device according to claim 8, wherein the third converting module is a rectifier circuit, and the fourth converting module is a DC-DC power converter;

the electrical signal receiver circuit further comprises: an electrical signal processing sub-circuit; wherein an input terminal of the electrical signal processing sub-circuit is connected to an output terminal of the second electrical signal converter sub-circuit, an output terminal of the electrical signal processing sub-circuit is connected to the display module, the electrical signal processing sub-circuit is configured to process the target DC electrical signal and to transmit the processed target DC electrical signal to the display module, and the electrical signal processing sub-circuit is a voltage regulated filter circuit and is configured to perform voltage regulation and filtering;

the electrical signal receiver circuit further comprises: a soft start sub-circuit; wherein an input terminal of the soft start sub-circuit is connected to the output terminal of the second electrical signal converter sub-circuit, an output terminal of the soft start sub-circuit is connected to the display module, and the soft start sub-circuit is configured to control a surge current generated in a case that the target DC electrical signal is transmitted to the display module within a target current range; wherein the soft start sub-circuit comprises a switch control module and a switch module; wherein an input terminal of the switch control module is connected to the output terminal of the second electrical signal converter sub-circuit, a control end of the switch control module is connected to the switch module, the switch control module is configured to transmit a drive signal to the switch module based on the target DC electrical signal, and the switch module is further connected to the display module, and is configured to transmit, in response to the drive signal, the target current circuit electrical signal to the display module.

11. The rotary display device according to claim 10, wherein the stationary portion further comprises a base, wherein the electrical signal transmitter circuit is disposed within the base.

12. The rotary display device according to claim 10, wherein the display module comprises a plurality of mini organic light-emitting diodes.

13. The rotary display device according to claim 10, wherein the rotary display device is a three-dimensional display device.

14. The rotary display device according to claim 7, wherein the electrical signal receiver circuit further comprises a soft start sub-circuit;
an input terminal of the soft start sub-circuit is connected to the output terminals of the second electrical signal converter sub-circuit, an output terminal of the soft start sub-circuit is connected to the display module, and the soft start sub-circuit is configured to control a surge current generated in a case that the target DC electrical signal is transmitted to the display module within a target current range.

15. The rotary display device according to claim 14, wherein the soft start sub-circuit comprises a switch control module and a switch module;
an input terminal of the switch control module is connected to the output terminal of the second electrical signal converter sub-circuit, a control end of the switch control module is connected to the switch module, and the switch control module is configured to transmit a drive signal to the switch module based on the target DC electrical signal;
the switch module is further connected to the display module, and is configured to transmit, in response to the drive signal, the target DC electrical signal to the display module.

16. The rotary display device according to claim 1, wherein the electrical signal processing sub-circuit is a voltage regulated filter circuit and is configured to perform voltage regulation and filtering.

17. The rotary display device according to claim 1, wherein the stationary portion further comprises a base, wherein the electrical signal transmitter circuit is disposed within the base.

18. The rotary display device according to claim 1, wherein the display module comprises a plurality of mini organic light-emitting diodes.

19. The rotary display device according to claim 1, wherein the rotary display device is a three-dimensional display device.

\* \* \* \* \*